United States Patent
Wang et al.

(10) Patent No.: US 11,425,393 B1
(45) Date of Patent: Aug. 23, 2022

(54) HARDWARE OPTIMIZATION OF RATE CALCULATION IN RATE DISTORTION OPTIMIZATION FOR VIDEO ENCODING

(71) Applicant: Meta Platforms, Inc., Menlo Park, CA (US)

(72) Inventors: Zhao Wang, Newark, CA (US);
Srikanth Alaparthi, Fremont, CA (US);
Yunqing Chen, Los Altos, CA (US);
Baheerathan Anandharengan, Milpitas, CA (US); Gaurang Chaudhari, Sunnyvale, CA (US);
Junqiang Lan, Fremont, CA (US);
Harikrishna Madadi Reddy, San Jose, CA (US); Prahlad Rao Venkatapuram, Saratoga, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/344,170

(22) Filed: Jun. 10, 2021

(51) Int. Cl.
*H04N 19/149* (2014.01)
*H04N 19/159* (2014.01)
(Continued)

(52) U.S. Cl.
CPC ......... *H04N 19/149* (2014.11); *H04N 19/103* (2014.11); *H04N 19/147* (2014.11); *H04N 19/159* (2014.11)

(58) Field of Classification Search
CPC .. H04N 19/149; H04N 19/103; H04N 19/147; H04N 19/159
(Continued)

(56) References Cited

U.S. PATENT DOCUMENTS 8,488,673 B2  7/2013  Dencher
10,057,590 B2  8/2018  Huang
(Continued)

OTHER PUBLICATIONS

Sarwer et al., Transform-Domain Rate-Distortion Optimization Accelerator for H.264/AVC Video Encoding, World Academy of Science, Engineering and Technology International Journal of Electrical and Computer Engineering, vol. 3, No. 11, 2009.

*Primary Examiner* — On S Mung
(74) *Attorney, Agent, or Firm* — Van Pelt, Yi & James LLP

(57) ABSTRACT

A system for calculating token rates for video encoding includes a plurality of different probability lookup tables implemented in hardware, wherein each of the probability lookup tables specifically corresponds to a different prediction mode of a video codec. The system includes an application-specific integrated circuit compute unit. For each candidate prediction mode among the different prediction modes, the application-specific integrated circuit is configured to determine a rate distortion cost (RD Cost) for a video. The application-specific integrated circuit is configured to select one of the plurality of different probability lookup tables that corresponds to the candidate prediction mode and use the selected one of the plurality of different probability lookup tables to calculate a corresponding token rate for the candidate prediction mode. The application-specific integrated circuit is configured to encode the video using a selected one of the different prediction modes determined based on the determined rate distortion costs.

20 Claims, 6 Drawing Sheets

(51) Int. Cl.
*H04N 19/103* (2014.01)
*H04N 19/147* (2014.01)

(58) Field of Classification Search
USPC .................................................. 375/240.02
See application file for complete search history.

(56) References Cited

U.S. PATENT DOCUMENTS

| | | |
|---|---|---|
| 10,085,024 B2 | 9/2018 | Yu |
| 10,742,995 B2 | 8/2020 | Jeong |
| 10,869,062 B2 | 12/2020 | Egilmez |
| 2013/0128966 A1* | 5/2013 | Gao .................. H04N 19/157 375/240.12 |
| 2015/0215621 A1 | 7/2015 | Liu |

* cited by examiner

HARDWARE OPTIMIZATION OF RATE CALCULATION IN RATE DISTORTION OPTIMIZATION FOR VIDEO ENCODING

BACKGROUND OF THE INVENTION

A video coding format is a content representation format for storage or transmission of digital video content (such as in a data file or bitstream). It typically uses a standardized video compression algorithm. Examples of video coding formats include H.262 (MPEG-2 Part 2), MPEG-4 Part 2, H.264 (MPEG-4 Part 10), HEW (H.26), Theora, RealVideo RV40, VP9, and AV1. A video codec is a device or software that provides encoding and decoding for digital video. Most codecs are typically implementations of video coding formats.

Recently, there has been an explosive growth of video usage on the Internet. Some websites (e.g., social media websites or video sharing websites) may have billions of users and each user may upload or download one or more videos each day. When a user uploads a video from a user device on to a website, the website may store the video in one or more different video coding formats, each being compatible with or more efficient for a certain set of applications, hardware, or platforms. Therefore, higher video compression rates are desirable. However, with higher compression rates come higher computational complexity, therefore, improved hardware architecture and techniques in video coding would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
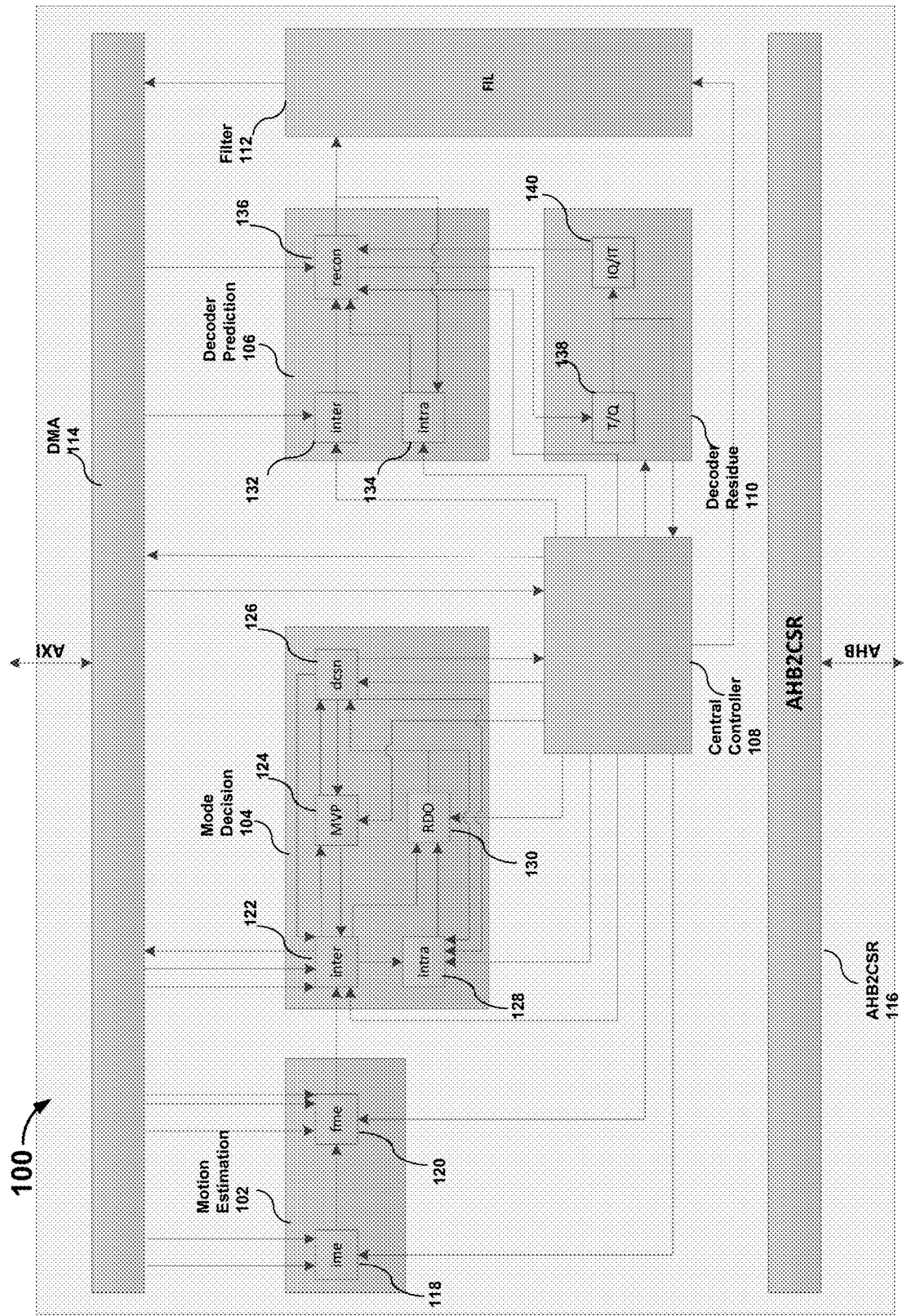
FIG. 1 illustrates a block diagram of an embodiment of a video encoder 100.

FIG. 1 illustrates a block diagram of an embodiment of a video encoder 100. For example, video encoder 100 supports the video coding format H.264 (MPEG-4 Part 10). However, video encoder 100 may also support other video coding formats as well, such as H.262 (MPEG-2 Part 2), MPEG-4 Part 2, HEVC (H.265), Theora, RealVideo RV40, AV1 (Alliance for Open Media Video 1), and VP9.

Video encoder 100 includes many modules. Some of the main modules of video encoder 100 are shown in FIG. 1. As shown in FIG. 1, video encoder 100 includes a direct memory access (DMA) controller 114 for transferring video data. Video encoder 100 also includes an AMBA (Advanced Microcontroller Bus Architecture) to CSR (control and status register) module 116. Other main modules include a motion estimation module 102, a mode decision module 104, a decoder prediction module 106, a central controller 108, a decoder residue module 110, and a filter 112.

Video encoder 100 includes a central controller module 108 that controls the different modules of video encoder 100, including motion estimation module 102, mode decision module 104, decoder prediction module 106, decoder residue module 110, filter 112, and DMA controller 114.

Video encoder 100 includes a motion estimation module 102. Motion estimation module 102 includes an integer motion estimation (IME) module 118 and a fractional motion estimation (FME) module 120. Motion estimation module 102 determines motion vectors that describe the transformation from one image to another, for example, from one frame to an adjacent frame. A motion vector is a two-dimensional vector used for inter-frame prediction; it refers the current frame to the reference frame, and its coordinate values provide the coordinate offsets from a location in the current frame to a location in the reference frame. Motion estimation module 102 estimates the best motion vector, which may be used for inter prediction in mode decision module 104. An inter coded frame is divided into blocks known as macroblocks. Instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as a motion vector, which points to the position of the matching block at the reference e. The process of motion vector determination is called motion estimation.

Video encoder 100 includes a mode decision module 104. The main components of mode decision module 104 include an inter prediction module 122, an intra prediction module 128, a motion vector prediction module 124, a rate-distortion optimization (RDO) module 130, and a decision module 126. Mode decision module 104 detects one prediction mode among a number of candidate inter prediction modes and intra prediction modes that gives the best results for encoding a block of video.

Intra prediction is the process of deriving the prediction value for the current sample using previously decoded sample values in the same decoded frame. Intra prediction exploits spatial redundancy, i.e., correlation among pixels within one frame, by calculating prediction values through extrapolation from already coded pixels for effective delta coding. Inter prediction is the process of deriving the prediction value for the current frame using previously decoded reference frames. Inter prediction exploits temporal redundancy.

Rate-distortion optimization (RDO) is the optimization of the amount of distortion (loss of video quality) against the amount of data required to encode the video, i.e., the rate. RDO module 130 provides a video quality metric that measures both the deviation from the source material and the bit cost for each possible decision outcome. Both inter prediction and intra prediction have different candidate prediction modes, and inter prediction and intra prediction that are performed under different prediction modes may result in final pixels requiring different rates and having different amounts of distortion and other costs.

For example, different prediction modes may use different block sizes for prediction. In some parts of the image there may be a large region that can all be predicted at the same time (e.g., a still background image), while in other parts there may be some fine details that are changing (e.g., in a talking head) and a smaller block size would be appropriate. Therefore, some video coding formats provide the ability to vary the block size to handle a range of prediction sizes. The decoder decodes each image in units of superblocks (e.g., 128×128 or 64×64 pixel superblocks). Each superblock has a partition that specifies how it is to be encoded. Superblocks may be divided into smaller blocks according to different partitioning patterns. This allows superblocks to be divided into partitions as small as 4×4 pixels.

Besides using different block sizes for prediction, different prediction modes may use different settings in inter prediction and intra prediction. For example, there are different inter prediction modes corresponding to using different reference frames, which have different motion vectors. For intra prediction, the intra prediction modes depend on the neighboring pixels, and AV1 uses eight main directional modes, and each allows a supplementary signal to tune the prediction angle in units of 3°. In VP9, the modes include DC, Vertical, Horizontal, TM (True Motion), Horizontal Up, Left Diagonal, Vertical Right, Vertical Left, Right Diagonal, and Horizontal Down.

RDO module 130 receives the output of inter prediction module 122 corresponding to each of the inter prediction modes and determines their corresponding amounts of distortion and rates, which are sent to decision module 126. Similarly, RDO module 130 receives the output of intra prediction module 128 corresponding to each of the intra prediction modes and determines their corresponding amounts of distortion and rates, which are also sent to decision module 126.

In some embodiments, for each prediction mode, inter prediction module 122 or intra prediction module 128 predicts the pixels, and the residual data (i.e., the differences between the original pixels and the predicted pixels) may be sent to RDO module 130, such that RDO module 130 may determine the corresponding amount of distortion and rate. For example, RDO module 130 may estimate the amounts of distortion and rates corresponding to each prediction mode by estimating the final results after additional processing steps (e.g., applying transforms and quantization) are performed on the outputs of inter prediction module 122 and intra prediction module 128.

Decision module 126 evaluates the cost corresponding to each inter prediction mode and intra prediction mode. The cost is based at least in part on the amount of distortion and the rate associated with the particular prediction mode. In some embodiments, the cost (also referred to as rate distortion cost, or RD Cost) may be a linear combination of the amount of distortion and the rate associated with the particular prediction mode; for example, RD Cost=distortion+ $\lambda$*rate, where $\lambda$ is a Lagrangian multiplier. The rate includes different components, including the coefficient rate, mode rate, partition rate, and token cost/probability. Other additional costs may include the cost of sending a motion vector in the bit stream. Decision module 126 selects the best inter prediction mode that has the lowest overall cost among all the inter prediction modes. In addition, decision module 126 selects the best intra prediction mode that has the lowest overall cost among all the intra prediction modes. Decision module 126 then selects the best prediction mode (intra or inter) that has the lowest overall cost among all the prediction modes. The selected prediction mode is the best mode detected by mode decision module 104.

After the best prediction mode is selected by mode decision module 104, the selected best prediction mode is sent to central controller 108. Central controller 108 controls decoder prediction module 106, decoder residue module 110, and filter 112 to perform a number of steps using the mode selected by mode decision module 104. This generates the inputs to an entropy coder that generates the final bitstream. Decoder prediction module 106 includes an inter prediction module 132, an intra prediction module 134, and a reconstruction module 136. If the selected mode is an inter prediction mode, then the inter prediction module 132 is used to do the inter prediction, whereas if the selected mode is an intra prediction mode, then the intra prediction module 134 is used to do the intra prediction. Decoder residue module 110 includes a transform and quantization module (T/Q) 138 and an inverse quantization and inverse transform module (IQ/IT) 140.

Figure 2:
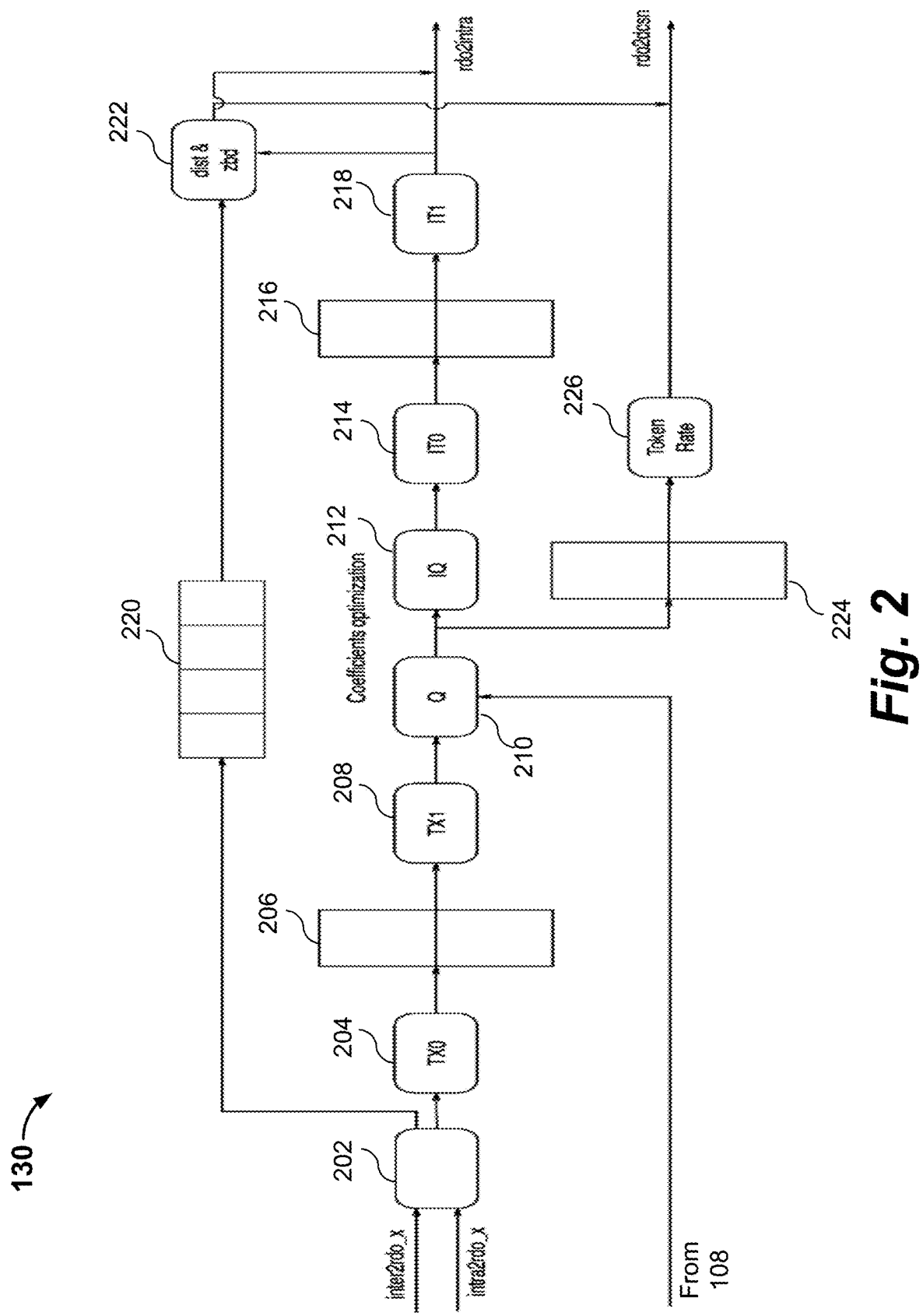
FIG. 2 illustrates an exemplary block diagram of RDO module 130.

FIG. 2 illustrates an exemplary block diagram of RDO module 130. RDO module 130 includes an arbiter and buffer module 202 for receiving inputs from inter prediction module 122 and intra prediction module 128, respectively. The received inputs include the residue data (i.e., the differences between the source/original pixels and the predicted pixels) corresponding to different prediction modes. The residue data is referred to as the original residue, given by original residue=source pixels−predicted pixels. These residues are then transformed using a 2-dimensional transform performed by two stages of transform modules, TX0 module 204 and TX1 module 208, with a transpose operation module 206 in between. After the transform, the transformed values form a transform block, which is a square transform coefficient matrix with a DC coefficient and a plurality of AC coefficients. The transform coefficients are then compressed further by quantizing the coefficients via a quantization module 210.

Distortion may be based on the original residue=source pixels−predicted pixels and the reconstruction residue. For example, one metric is the sum of the squared estimate of errors (SSE), the sum of the squares of the original residue. In order to estimate the amounts of distortion experienced by the decoder, a number of processing steps are performed on the quantized coefficients. Inverse quantization (i.e., dequantization) is performed by a dequantization module 212 and an inverse transform is performed by two stages of inverse transform modules, IT0 module 214 and IT1 module 218, with a transpose operation module 216 in between. The results after the inverse transform are then compared with the original block of residual pixels at the output of a buffer 220 by a distortion estimation module 222, such that the amounts of distortion corresponding to different prediction modes are determined and sent to decision module 126.

The rates associated with sending the data corresponding to a block in a bitstream are also estimated by RDO module 130. One component of the rate is the coefficient rate, which is the rate associated with sending the quantized coefficients in the bitstream. The quantized coefficients at the output of quantization module 210 are sent to a ping-pong buffer 224 and a token rate module 226, where the rate associated with a particular block may be estimated. The rates are estimated by token rate module 226 without performing the actual encoding, because the actual encoding of the bitstream is computationally intensive and requires additional information, e.g., neighbor dependency or other neighbor information, which is not available. Coefficient rate estimation by token rate module 226 is performed for every transform unit (TU) that goes through the RDO process in mode decision module 104. The rate estimation is based on the quantized coefficients.

In some video coding formats, token rates are calculated by RDO module 130 by performing a series of lookup table checking. For example, in H.264 (MPEG-44 Part 10), token rates are calculated by performing a series of lookup table checking, and the lookup table is a large two dimensional array lookup table. In a software implementation, performing a series of lookup table checking is straight forward and efficient. However, in a hardware implementation, performing a series of lookup table checking on such a large two dimensional array lookup table would cause an excessive amount of design area and power consumption. Therefore, improved techniques to reduce the amount of design area and power consumption would be desirable.

In the present application, a system for calculating token rates for video encoding is disclosed. The system includes a plurality of different probability lookup tables implemented in hardware, wherein each of the plurality of probability lookup tables specifically corresponds to a different prediction mode of a video codec. The system further includes an application-specific integrated circuit compute unit. For each candidate prediction mode among the different prediction modes of the video codec, the application-specific integrated circuit is configured to determine a rate distortion cost (RD Cost) for a video to be encoded. The application-specific integrated circuit is configured to select one of the plurality of different probability lookup tables that corresponds to the candidate prediction mode and use the selected one of the plurality of different probability lookup tables to calculate a corresponding token rate for the candidate prediction mode. The application-specific integrated circuit is further configured to encode the video using a selected one of the different prediction modes determined based on the determined rate distortion costs.

To minimize the silicon area and power consumption, the lookup table may be divided into a plurality of different smaller lookup tables. In some embodiments, the lookup table may be divided into a plurality of smaller lookup tables, each corresponding to a different mode. When RDO module 130 processes a different mode, one of the smaller lookup tables is selected based on the selected mode, and the token rates are calculated by performing a series of lookup table checking on the smaller lookup tables. The advantage is that the amount of design area and power consumption is significantly reduced.

Figure 3:
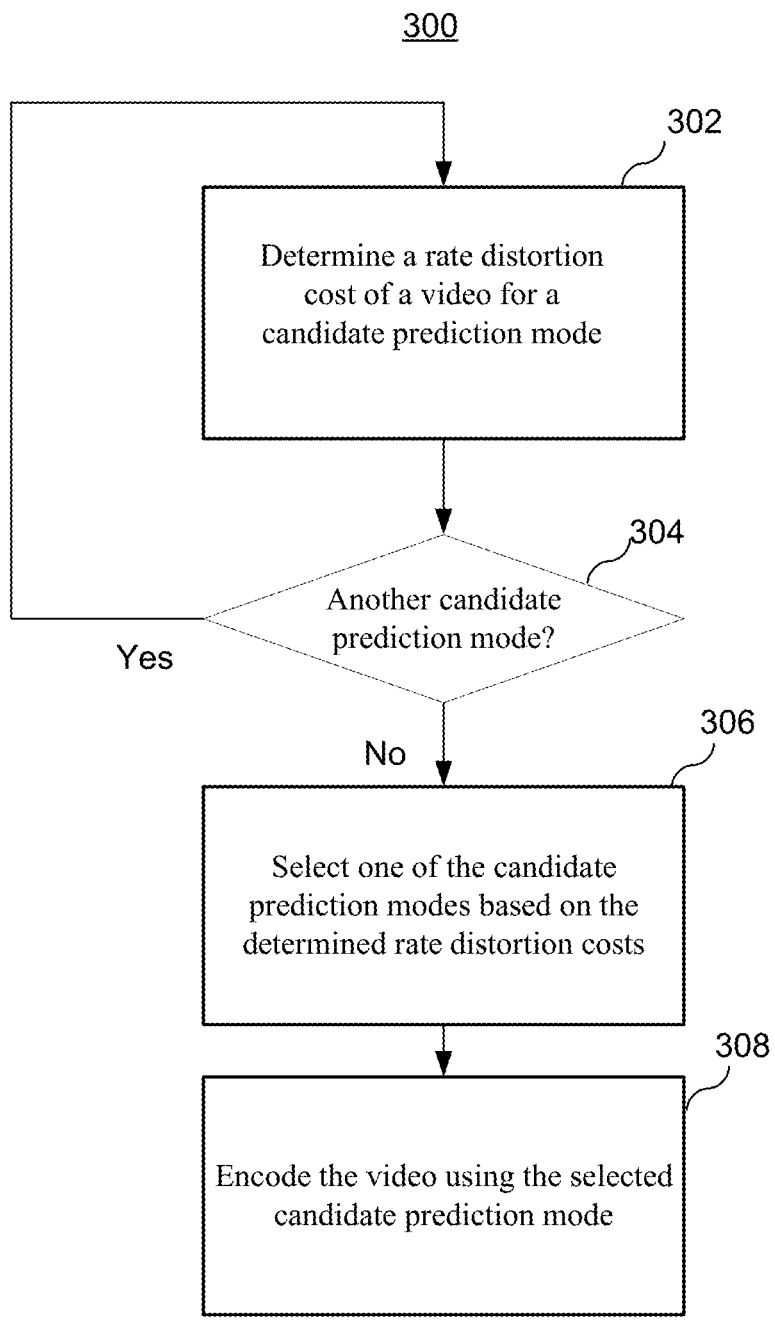
FIG. 3 illustrates an exemplary process 300 for encoding a video using a prediction mode determined at least in part based on a plurality of determined rate distortion costs.

FIG. 3 illustrates an exemplary process 300 for encoding a video using a prediction mode determined at least in part based on a plurality of determined rate distortion costs. In some embodiments, process 300 is performed by video encoder 100. In process 300, mode decision module 104 detects one prediction mode among a number of candidate inter prediction modes and intra prediction modes that gives the best results for encoding a block of video. For each candidate prediction mode among different prediction modes of the video codec, a rate distortion cost associated with encoding a video using the candidate prediction mode is determined. The video is encoded using a selected one of the different prediction modes determined based on the determined rate distortion costs.

At step 302, a rate distortion cost of a video for a candidate prediction mode is determined. There are a number of candidate prediction modes, including a number of candidate inter prediction modes and candidate intra prediction modes. Intra prediction exploits spatial redundancy. Inter prediction exploits temporal redundancy. Both inter prediction and intra prediction have different candidate prediction modes, and inter prediction and intra prediction that are performed under different prediction modes may result in final pixels requiring different rates and having different amounts of distortion and other costs. For example, different prediction modes may use different block sizes for prediction. Besides using different block sizes for prediction, different prediction modes may use different settings in inter prediction and intra prediction.

RDO module 130 receives the output of inter prediction module 122 or the output of intra prediction module 128 corresponding to each of the prediction modes and determines their corresponding amounts of distortion and rates, which are sent to decision module 126. Decision module 126 evaluates the cost corresponding to each inter prediction mode and intra prediction mode. In some embodiments, the cost (also referred to as rate distortion cost, or RD Cost) may be a linear combination of the amount of distortion and the rate associated with the particular prediction mode; for example, RD Cost=distortion+$\lambda$*rate, where $\lambda$ is a Lagrangian multiplier. The rate includes different components, including the coefficient rate, mode rate, partition rate, and token cost/probability. Other additional costs may include the cost of sending a motion vector in the bit stream.

At step 304, whether there is another candidate prediction mode to process is determined. If all the candidate prediction modes have been processed, then process 300 proceeds to step 306; otherwise, process 300 returns to step 302 to process another candidate prediction mode.

At step 306, one of the candidate prediction modes is selected based on the determined rate distortion costs. Decision module 126 selects the best prediction mode (intra or inter) that has the lowest overall cost among all the prediction modes. The selected prediction mode is the best mode detected by mode decision module 104.

At step 308, the video is encoded using the selected candidate prediction mode. After the best prediction mode is selected by mode decision module 104, the selected best prediction mode is sent to central controller 108. Central controller 108 controls decoder prediction module 106, decoder residue module 110, and filter 112 to perform a number of steps using the mode selected by mode decision module 104. This generates the inputs to an entropy coder that generates the final bitstream.

Figure 4:
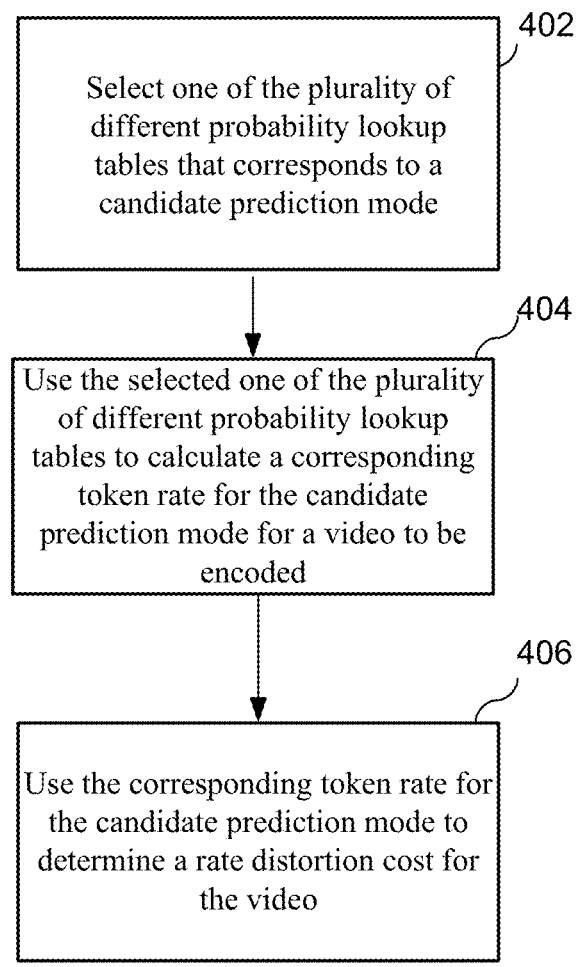
FIG. 4 illustrates an exemplary process 400 for determining a rate distortion cost of a video for a candidate prediction mode.

FIG. 4 illustrates an exemplary process 400 for determining a rate distortion cost of a video for a candidate prediction mode. In some embodiments, process 400 is performed at step 302 of process 300.

At step 402, one of the plurality of different probability lookup tables that corresponds to a candidate prediction mode is selected.

Figure 5:
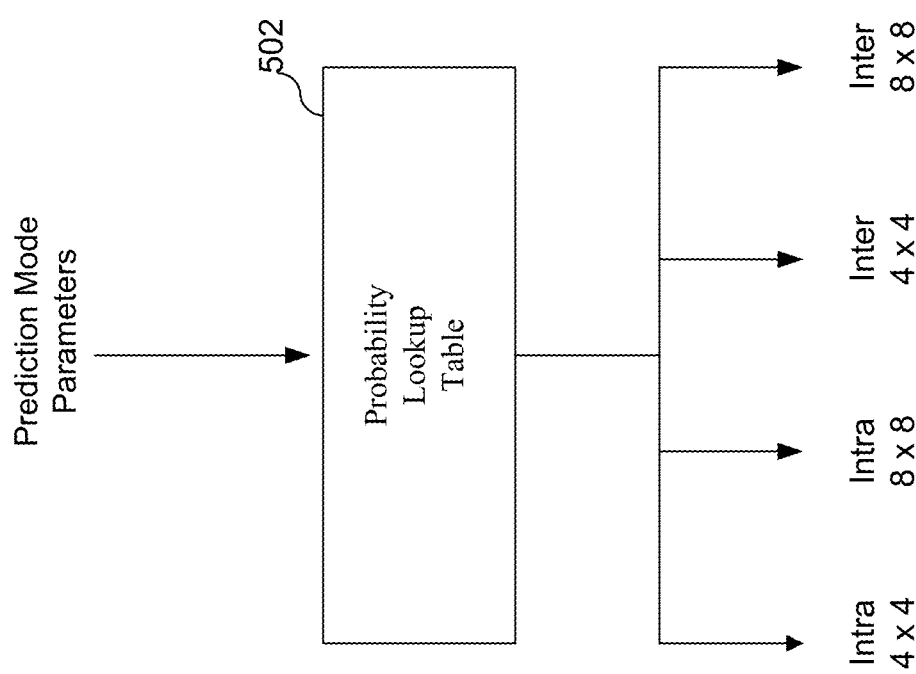
FIG. 5 illustrates one example of a software implementation in which a plurality of prediction mode parameters may be used as an index for looking up a probability lookup table 502.

Traditionally, token rates are calculated by RDO module 130 by performing a series of lookup table checking. For example, in H.264 (MPEG-4 Part 10), token rates are calculated by performing a series of lookup table checking, and the lookup table is a large two dimensional array lookup table. FIG. 5 illustrates one example of a software implementation in which a plurality of prediction mode parameters may be used as an index for looking up a probability lookup table 502, and the values read from the probability lookup table 502 may be used to calculate the token rates for a plurality of prediction modes, including intra prediction with a 4×4 partition block size, intra prediction with an 8×8 partition block size, inter prediction with a 4×4 partition block size, and inter prediction with an 8×8 partition block size.

In contrast, in a hardware implementation, the original two dimensional array probability table defined by the video coding format may be partitioned into a plurality of smaller lookup tables, each corresponding to a different mode. The plurality of different probability lookup tables are partitions of an original probability lookup table that are partitioned based on one or more parameters defined by a video coding standard, e.g., H.264 (MPEG-4 Part 10).

Figure 6:
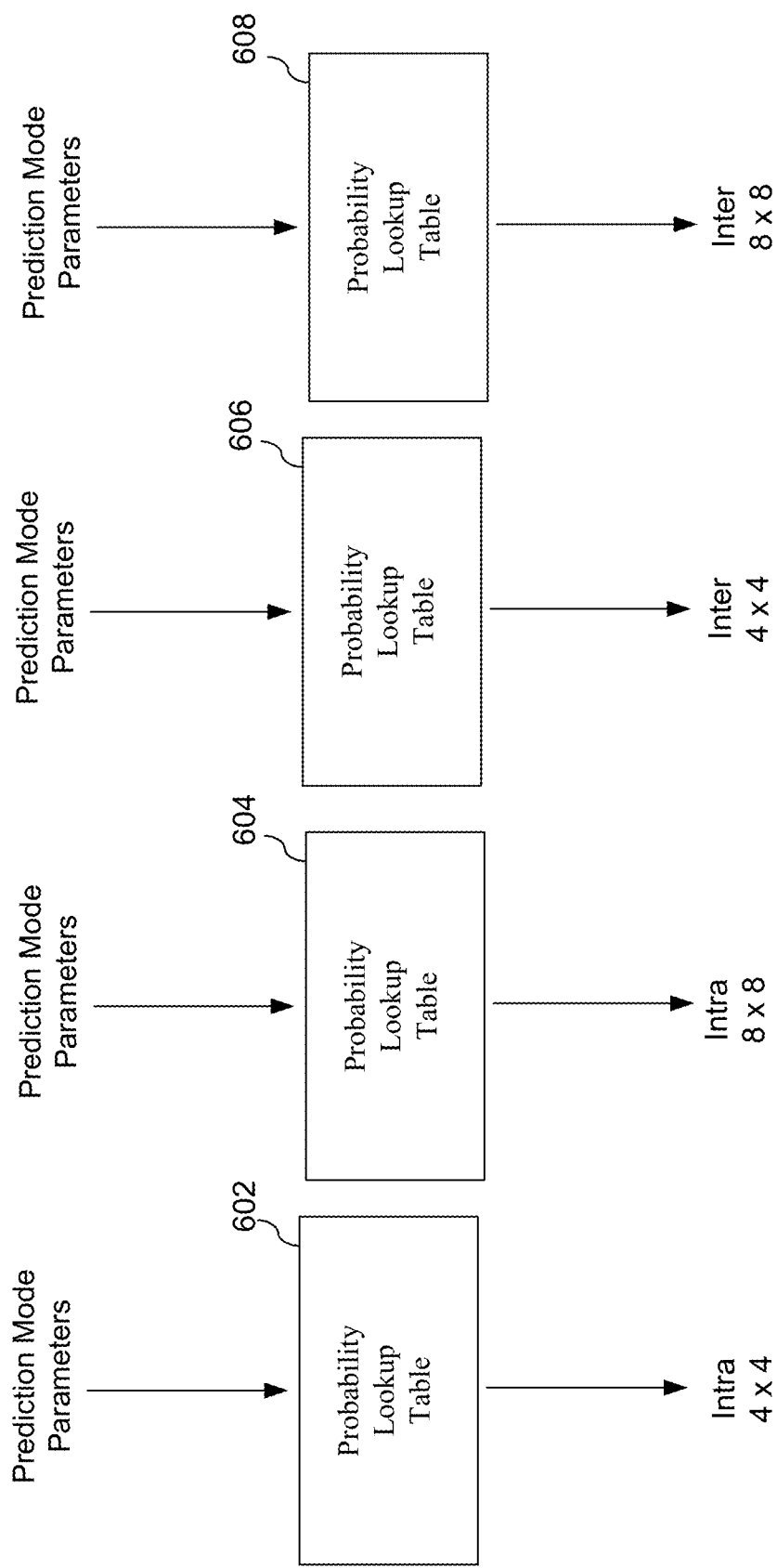
FIG. 6 illustrates an example of a hardware implementation in which probability lookup table 502 may be partitioned into four smaller lookup tables, including probability lookup table 602, probability lookup table 604, probability lookup table 606, and probability lookup table 608.

FIG. 6 illustrates an example of a hardware implementation in which probability lookup table 502 may be partitioned into four smaller lookup tables, including probability lookup table 602, probability lookup table 604, probability lookup table 606, and probability lookup table 608. When RDO module 130 processes a different mode, one of the smaller lookup tables is selected based on the selected mode. As shown in FIG. 6, a plurality of prediction mode parameters may be used to select one of the smaller probability lookup tables (602, 604, 606, and 608). For example, probability lookup table 602 corresponds to the mode with intra prediction and a transform unit size of 4×4, probability lookup table 604 corresponds to the mode with intra prediction and a transform unit size of 8×8, probability lookup table 606 corresponds to the mode with inter prediction and a transform unit size of 4×4, and probability lookup table 608 corresponds to the mode with inter prediction and a transform unit size of 8×8.

At step 404, the selected probability lookup table is used to calculate a corresponding token rate for the candidate prediction mode. As shown in FIG. 6, the prediction mode parameters may be used as an index for looking up the selected probability lookup table. The values read from the selected probability lookup table may be used to calculate the token rate for one of the four prediction modes.

At step 406, the corresponding token rate for the candidate prediction mode is used to determine a rate distortion cost for the video. The output at step 406 may be used in step 302 of process 300 in FIG. 3.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
for each candidate prediction mode among different prediction modes of a video codec:
selecting by an application-specific integrated circuit one of a plurality of different probability lookup tables that corresponds to the candidate prediction mode;
using by the application-specific integrated circuit the selected one of the plurality of different probability lookup tables to calculate a corresponding token rate for the candidate prediction mode for a video to be encoded; and
using by the application-specific integrated circuit the corresponding token rate for the candidate prediction mode to determine a rate distortion cost for the video; and
encoding the video using a selected one of the different prediction modes determined based on the determined rate distortion costs.

2. The method of claim 1, wherein a prediction mode comprises one or more parameters defined by a standardized video coding format, wherein the one or more parameters comprise a transform unit size, and wherein the standardized video coding format is selected from a group consisting of: H.262, H.264, H.265, Theora, RealVideo RV40, VP9, and AV1.

3. The method of claim 1, wherein each of the plurality of different probability lookup tables comprises a partition of an original probability lookup table that is partitioned based on one or more parameters defined by a video coding standard.

4. The method of claim 3, wherein the partitions of the original probability lookup table are partitioned based on a type of prediction that exploits a type of redundancy.

5. The method of claim 4, wherein the type of redundancy comprises spatial redundancy.

6. The method of claim 4, wherein the type of prediction comprises intra prediction.

7. The method of claim 4, wherein the type of redundancy comprises temporal redundancy.

8. The method of claim 4, wherein the type of prediction comprises inter prediction.

9. The method of claim 3, wherein the partitions of the original probability lookup table are partitioned based on one or more transform unit sizes defined by the video coding standard.

10. The method of claim 9, wherein the one or more transform unit sizes comprise 4×4 and 8×8.

11. A system, comprising:
a plurality of different probability lookup tables implemented in hardware, wherein each of the plurality of different probability lookup tables specifically corresponds to a different prediction mode of a video codec; and
an application-specific integrated circuit compute unit configured to:

for each candidate prediction mode among the different prediction modes of the video codec:
   select one of the plurality of different probability lookup tables that corresponds to the candidate prediction mode;
   use the selected one of the plurality of different probability lookup tables to calculate a corresponding token rate for the candidate prediction mode for a video to be encoded; and
   use the corresponding token rate for the candidate prediction mode to determine a rate distortion cost for the video; and
encode the video using a selected one of the different prediction modes determined based on the determined rate distortion costs.

12. The system of claim 11, wherein a prediction mode comprises one or more parameters defined by a standardized video coding format, wherein the one or more parameters comprise a transform unit size, and wherein the standardized video coding format is selected from a group consisting of: H.262, H.264, H.265, Theora, RealVideo RV40, VP9, and AV1.

13. The system of claim 11, wherein each of the plurality of different probability lookup tables comprises a partition of an original probability lookup table that is partitioned based on one or more parameters defined by a standardized video coding format, and wherein the standardized video coding format is selected from a group consisting of: H.262, H.264, H.265, Theora, RealVideo RV40, VP9, and AV1.

14. The system of claim 13, wherein the partitions of the original probability lookup table are partitioned based on a type of prediction that exploits a type of redundancy.

15. The system of claim 14, wherein the type of redundancy comprises spatial redundancy.

16. The system of claim 14, wherein the type of prediction comprises intra prediction.

17. The system of claim 14, wherein the type of redundancy comprises temporal redundancy.

18. The system of claim 14, wherein the type of prediction comprises inter prediction.

19. The system of claim 13, wherein the partitions of the original probability lookup table are partitioned based on one or more transform unit sizes defined by the video coding standard.

20. A system, comprising:
A processor comprising logic to:
   for each candidate prediction mode among different prediction modes of a video codec:
      select one of a plurality of different probability lookup tables that corresponds to the candidate prediction mode;
      use the selected one of the plurality of different probability lookup tables to calculate a corresponding token rate for the candidate prediction mode for a video to be encoded; and
      use the corresponding token rate for the candidate prediction mode to determine a rate distortion cost for the video; and
   encode the video using a selected one of the different prediction modes determined based on the determined rate distortion costs; and
a memory coupled to the processor and configured to provide the processor with instructions.

* * * * *